(12) United States Patent
Peinado et al.

(10) Patent No.: US 8,316,448 B2
(45) Date of Patent: Nov. 20, 2012

(54) AUTOMATIC FILTER GENERATION AND GENERALIZATION

(75) Inventors: Marcus Peinado, Bellevue, WA (US); Manuel Costa, Cambridge (GB); Miguel Castro, Cambridge (GB); Lidong Zhou, Sunnyvale, CA (US); Lintao Zhang, Sunnyvale, CA (US)

(73) Assignee: Microsoft Corporation, Redmond, WA (US)

( * ) Notice: Subject to any disclaimer, the term of this patent is extended or adjusted under 35 U.S.C. 154(b) by 1057 days.

(21) Appl. No.: 11/925,575

(22) Filed: Oct. 26, 2007

(65) Prior Publication Data

US 2009/0113550 A1 Apr. 30, 2009

(51) Int. Cl.
*H04L 29/06* (2006.01)
(52) U.S. Cl. ......................................................... 726/25
(58) Field of Classification Search .................... 726/25
See application file for complete search history.

(56) References Cited

U.S. PATENT DOCUMENTS

| | | | |
|---|---|---|---|
| 5,317,740 A | 5/1994 | Sites | |
| 5,465,355 A | 11/1995 | Cook et al. | |
| 5,790,778 A | 8/1998 | Bush et al. | |
| 6,182,243 B1 | 1/2001 | Berthe et al. | |
| 6,266,788 B1 | 7/2001 | Othmer et al. | |
| 6,629,267 B1 | 9/2003 | Glerum et al. | |
| 6,701,514 B1 | 3/2004 | Haswell et al. | |
| 6,952,779 B1 | 10/2005 | Cohen et al. | |
| 7,024,409 B2 | 4/2006 | Iyengar | |
| 7,178,166 B1 | 2/2007 | Taylor et al. | |
| 7,237,265 B2 | 6/2007 | Reshef et al. | |
| 7,284,274 B1 * | 10/2007 | Walls et al. | 726/25 |
| 7,380,171 B2 | 5/2008 | Prescott et al. | |
| 7,587,636 B2 | 9/2009 | Tillmann et al. | |
| 7,979,844 B2 | 7/2011 | Srinivasan | |
| 2003/0208457 A1 | 11/2003 | Iyengar | |
| 2005/0028036 A1 | 2/2005 | Shibata | |
| 2005/0198527 A1 | 9/2005 | Johnson et al. | |
| 2005/0289404 A1 | 12/2005 | Maguire | |
| 2006/0021054 A1 | 1/2006 | Costa et al. | |

(Continued)

FOREIGN PATENT DOCUMENTS

WO WO0074193 A1 12/2000

OTHER PUBLICATIONS

Vigilante: End-to-ENd Containment of Internet Worms. Maneul Costa, Jon Crowcroft, Miguel Castro, Antony Rowstron, Lidong Zhou, Lintao Zhang, and Paul Barham. Oct. 23-26, 2005. (included in IDS).*

(Continued)

*Primary Examiner* — Jason Gee
(74) *Attorney, Agent, or Firm* — Lee & Hayes, PLLC

(57) ABSTRACT

Methods and architectures for automatic filter generation are described. In an embodiment, these filters are generated in order to block inputs which would otherwise disrupt the normal functioning of a program. An initial set of filter conditions is generated by analyzing the path of a program from a point at which a bad input is received to the point at which the malfunctioning of the program is detected and creating conditions on an input which ensure that this path is followed. Having generated the initial set of filter conditions, the set is made less specific by determining which instructions do not influence whether the point of detection of the attack is reached and removing the filter conditions which correspond to these instructions.

22 Claims, 9 Drawing Sheets

U.S. PATENT DOCUMENTS

| | | | |
|---|---|---|---|
| 2006/0031933 | A1 | 2/2006 | Costa et al. |
| 2006/0136784 | A1 | 6/2006 | Prescott et al. |
| 2006/0190770 | A1 | 8/2006 | Harding |
| 2006/0253739 | A1 | 11/2006 | Godefroid et al. |
| 2006/0277539 | A1 | 12/2006 | Amarasinghe et al. |
| 2006/0282897 | A1 | 12/2006 | Sima et al. |
| 2007/0011741 | A1 | 1/2007 | Robert et al. |
| 2007/0067848 | A1 | 3/2007 | Gustave et al. |
| 2007/0074149 | A1 | 3/2007 | Ognev et al. |
| 2008/0134148 | A1 | 6/2008 | Clark |
| 2008/0295081 | A1 | 11/2008 | Albot et al. |
| 2009/0125887 | A1 | 5/2009 | Kahlon et al. |
| 2010/0198799 | A1 | 8/2010 | Krishnan et al. |

OTHER PUBLICATIONS

Agrawal, Hiralal. "Dynamic Program Slicing." pp. 1-11. included in Applicant's IDS. Appeared in the Proceedings of the ACM SiGPLAN '9-Conference on Proramming Language Design and Implementation.*

Abadi, et al., "Control-flow Integrity: Principles, Implementations, and Applications", ACM, 2005, pp. 14.

Agrawal, et al., "Dynamic Program Slicing", ACM SIGPLAN, vol. 25, No. 6, Jun. 1990, pp. 246-256.

Barnett, et al., "Weakest-Precondition of Unstructured Programs", pp. 8.

Berger, et al., "DieHard: Probabilistic Memory Safety for Unsafe Languages", ACM, 2005, pp. 10.

Bhansali, et al., "Framework for Instruction-Level Tracing and Analysis of Program Executions", VEE, 2006, pp. 10.

Brumley, et al., "Creating Vulnerability Signatures Using Weakest Pre-Conditions", IEEE, 2007, pp. 15.

Brumley, et al., "Towards Automatic Generation of Vulnerability Signatures", pp. 15.

Cadar, et al., "Exe: Automatically Generating Inputs of Death", ACM, 2006, pp. 14.

Castro, et al., "Securing Software by Enforcing Data-Flow Integrity", pp. 14.

Chen, et al., "Defeating Memory Corruption Attacks Via Pointer Taintedness Detection", pp. 10.

Chen, et al., "Non-Control-Data Attacks Are Realistic Threats", pp. 15.

Costa, et al., "Bouncer: Securing Software by Blocking Bad Input", ACM, 2007, pp. 14.

Costa, et al., "End-To-End Containment of Internet Worm Epidemics", University of Cambridge, Oct. 2006, pp. 140.

Costa, et al., "Vigilante: End-to-End Containment of Internet Worms", ACM, 2005, pp. 15.

Cowan, et al., "Stackguard: Automatic Detection and Prevention of Buffer-Overrun Attacks", USENIX, 1998, pp. 63-77.

Crandall, et al., "On Deriving Unknown Vulnerabilities From Zero-Day Polymorphic and Metamorphic Worm Exploits", ACM, 2005, pp. 14.

Cui, et al., "Shieldgen: Automatic Data Patch Generation for Unknown Vulnerabilities With Informed Probing", pp. 15.

Dijkstra, et al., "Guarded Commands, Nondeterminacy and Formal Derivation of Programs", Association for Computing Machinery, Inc., 1975, pp. 453-457.

Elnozahy, et al., "A Survey of Rollback-Recovery Protocols in Message-Passing Systems", Carnegie Mellon University, Jun. 1999, pp. 44.

Godefroid, "Compositional Dynamic Test Generation", ACM, Jul. 14, 2006, pp. 12.

Godefroid, et al., "DART: Directed Automated Random Testing", ACM, 2005, pp. 11.

Jhala, et al., "Path Slicing", ACM, 2005, pp. 10.

Kephart, et al., "Automatic Extraction of Computer Virus Signatures", retrieved on Sep. 17, 2007, at <<http://66.102.1.104/scholar?hl=en&lr=&q=cache:-MEW6AL9N4IJ:WWW1.cs.columbi...>>, pp. 22.

Kim, et al., "Autograph: Toward Automated, Distributed Worm Signature Detection", pp. 16.

King, et al., "Symbolic Execution and Program Testing", Association for Computing Machinery, Inc., 1976, pp. 385-394.

Kiriansky, et al., "Secure Execution Via Program Shepherding", USENIX, 2002, pp. 16.

Kreibich, et al., "Honeycomb—Creating Intrusion Detection Signatures Using Honeypots", pp. 6.

Liang, et al., "Automatic Generation of Buffer Overflow Signatures: An Approach Based on Program Behavior Models", pp. 10.

Liang, et al., "Fast and Automated Generation of Attack Signatures: A Basis for Building Self-Protecting Servers", ACM, 2005, pp. 10.

Moore, et al., "Inside The Slammer Worm", IEEE, 2003, pp. 33-39.

Newsome, et al., "Dynamic Taint Analysis for Automatic Detection, Analysis, and Signature Generation of Exploits on Commodity Software", retrieved on Aug. 13, 2007, at <<http://64.233.183.104/search?q=cache:6DAtFyhOY98J:valgrind.org/docs/newsome2005.pdf+Dynamic+Taint+Analysis+for+Automatic+Detection,+Analysis,+and+Signature+Generation+of+Exploits+on+Commodity+Software&hl=en&ct=clnk&cd=1 >>, pp. 14.

Newsome, et al., "Polygraph: Automatically Generating Signatures for Polymorphic Worms", pp. 16.

Newsome, et al., "Vulnerability-Specific Execution Filtering for Exploit Prevention on Commodity Software", pp. 14.

"Phoenix Framework", at <<http://research.microsoft.com/phoenix/phoneixrdk.aspx>>, Microsoft Corporation, 2007, pp. 2.

Qin, et al., "Rx: Treating Bugs As Allergies—A Safe Method to Survive Software Failures", ACM, 2005, pp. 14.

Rinard, et al., "Enhancing Server Availability and Security Through Failure-Oblivious Computing", pp. 14.

Ruwase, et al., "A Practical Dynamic Buffer Overflow Detector", pp. 11.

Singh, et al., "Automated Worm Fingerprinting", pp. 16.

Toth, et al., "Accurate Buffer Overflow Detection Via Abstract Payload Execution", Distributed Systems Group, Apr. 30, 2002, pp. 18.

Tucek, et al., "Sweeper: A Lightweight End-To-End System for Defending Against Fast Worms", ACM, 2007, pp. 15.

Wang, et al., "Shield: Vulnerability-Driven Network Filters for Preventing Known Vulnerability Exploits", at <<http://research.microsoft.com/research/shield/papers/81.pdf>>, Feb. 2004, pp. 14.

Wang, et al., "Sigfree: A Signature-Free Buffer Overflow Attack Blocker", pp. 16.

Weimer, et al., "Finding and Preventing Runtime Error Handling Mistakes", ACM, 2004, pp. 13.

Weiser, "Program Slicing", IEEE, 1981, pp. 439-449.

Zhang, et al., "Cost Effective Dynamic Program Slicing", ACM, 2004, pp. 13.

Broadwell, et al., "Scrash: A System for Generating Secure Crash Information", available at least as early as Aug 20, 2007, at <<http://66.102.9.104/search?q=cache:9Ph8UzKMqLEJ:www.cs.berkeley.edu/~nks/scrash/scrash-usenix.pdf+Maintain+data+privacy+in+generating+bug+reports&hl=en&ct=clnk&cd=2&gl=uk>>, pp. 1.

Cadar, et al., "Exe: Automatically Generating Inputs of Death", ACM, Oct. 2006, pp. 14.

Dutertre, et al., "A Fast Linear-Arithmetic Solver for DPLL(T)", Aug. 2006, pp. 75.

Engler, et al., "Under-constrained Execution: Making Automatic Code Destruction Easy and Scalable", at <<http://www.stanford.edu/~engler/issta07v-engler.pdf>>, ACM, Jul. 9-12, 2007, pp. 4.

Sweeney, "k-Anonymity: A Model for Protecting Privacy", International Journal on Uncertainty, Fuzziness and Knowl.-Based Syst., May 2002, pp. 557-570.

Rushby, "Automated Test Generation and Verified Software?", at <<http://www.csl.sri.com/users/rushby/papers/vstte07.pdf>>, IFIP, 2007, pp. 11.

Samarati, et al., "Generalizing Data to Provide Anonymity When Disclosing Information", ACM, 1998, pp. 1.

Sen, et al., "CUTE: A Concolic Unit Testing Engine for C", ACM, 2005, pp. 10.

"Submitting Bug Reports", available at least as early as Aug. 20, 2007, at <<http://java.sun.com/javase/6/webnotes/trouble/TSG-Desktop/html/bugreports.html>>, pp. 6.

Tucek, et al., "Automatic On-line Failure Diagnosis at the End-User Site", available at least as early as Aug. 20, 2007, at <<http://www.usenix.org/events/hotdep06/tech/prelim_papers/tucek/tucek.pdf>>, pp. 6.

"YICES: An SMT Solver", retrieved on Oct. 29, 2007, at <<http://yices.csl.sri.com>>, pp. 1.

"Z3 An Efficient SMT Solver", retrieved on Oct. 29, 2007, at <<http://research.microsoft.com/projects/z3/.>>, pp. 1.

Zeller, "Simplifying and Isolating Failure-Inducing Input", at <<http://www.cs.purdue.edu/homes/jv/510s05/papers/puff.pdf>>, IEEE, vol. 28, No. 2, Feb. 2002, pp. 17.

Fischer, et al., "System Evolution Tracking Through Execution Trace Analysis", IEEE Computer Society, In the Proceedings of the 13th International Workshop on Program Comprehension, 2005, 10 pgs.

Hamou-Lhadj, et al., "Compression Techniques to Simplify the Analysis of Large Execution Traces", IEEE Computer Society, In the Proceedings of the 10th International Workshop on Program Comprehension, 2002, 10 pgs.

* cited by examiner

AUTOMATIC FILTER GENERATION AND GENERALIZATION

COPYRIGHT NOTICE

A portion of the disclosure of this patent contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND

Attackers exploit software vulnerabilities to control or crash programs. This is a serious problem because software can have many vulnerabilities and attacks can be frequent. Techniques have therefore been developed to protect against such attacks. Some techniques detect attacks by adding checks to programs: safe languages include checks to ensure type safety and they throw exceptions when the checks fail (e.g. Java and C#), and checks can be added transparently to programs written in unsafe languages. However, these techniques add significant overhead because the checks are performed whilst the software is running and often detect attacks too late when the only way to recover may be to restart the program. Other techniques use filters to filter out malicious input messages. These filters may be computed centrally using symbolic execution along the path taken by a sample malicious input. Having generated such a filter, it may be shared with other users of the program so that similar attacks can be prevented. However, attackers can bypass these filters by generating exploits that follow a different execution path.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

Methods and architectures for automatic filter generation are described. In an embodiment, these filters are generated in order to block inputs which would otherwise disrupt the normal functioning of a program. An initial set of filter conditions is generated by analyzing the path of a program from a point at which a bad input is received to the point at which the malfunctioning of the program is detected and creating conditions on an input which ensure that this path is followed. For example, where a branch in the program is reached and the branch taken depends on the size of the input, a condition on the size of the input can be generated based on the knowledge of the actual path taken. Having generated the initial set of filter conditions, the set is made less specific by determining which instructions do not influence whether the point of detection of the attack is reached and removing the filter conditions which correspond to these instructions.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

As described above, attackers exploit software vulnerabilities to control or crash programs. The attacks may be received by email or by any other means. Existing techniques to combat these attacks involve adding checks to programs which are performed during the operation of the program or involve using filters to block malicious inputs to a program. The addition of checks, however, adds significant overhead and in many cases the program must be restarted once a check identifies a problem. Use of filters does block some malicious inputs, but attackers can bypass these filters by generating exploits that follow a different execution path within the program.

Figure 1:
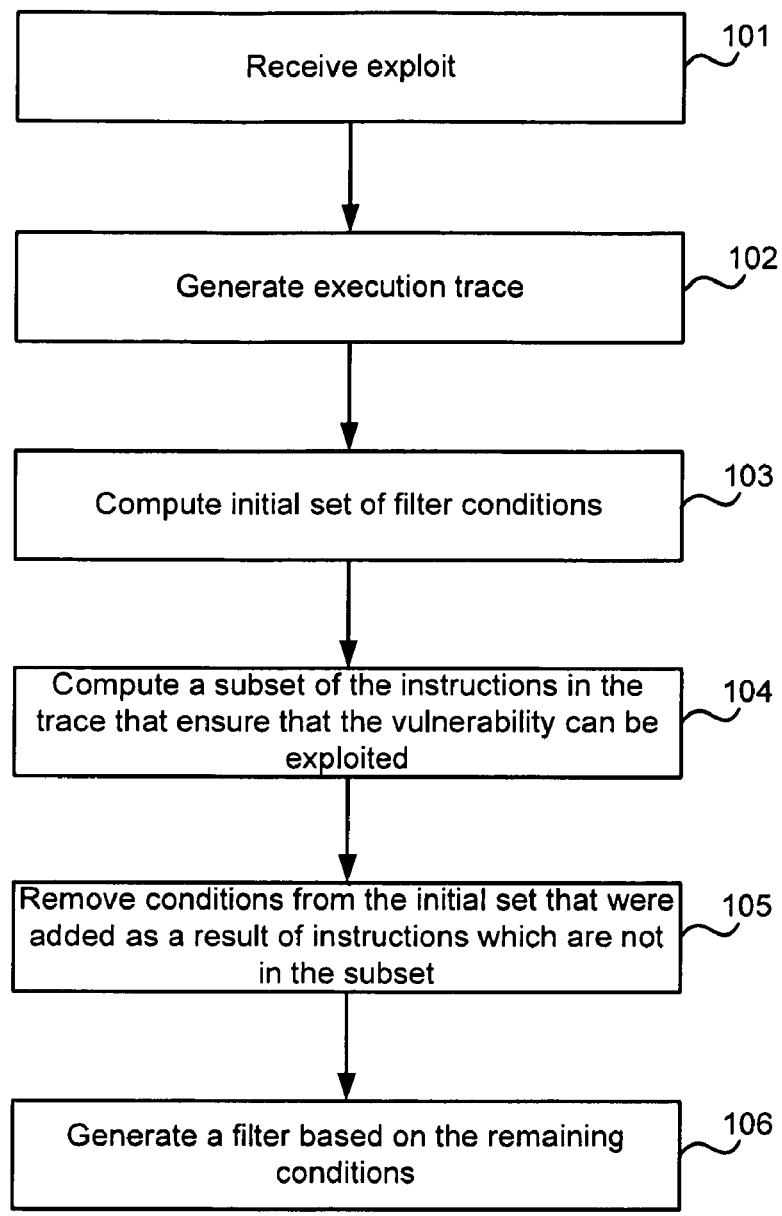
FIG. 1 is a flow diagram of an example method of automatic filter generation.

FIG. 1 is a flow diagram of an example method of automatic filter generation. The filters which are generated are specific to a particular program, referred to as the 'vulnerable program' and once generated may be used by any computing device running the vulnerable program to filter out those inputs to the program which would otherwise result in a malfunctioning of the program. The method of filter generation may be performed locally (i.e. on the same computing device that is running the vulnerable program and filtering inputs) or centrally, with the filters (or the filter conditions) being distributed to, and implemented by, the computing devices which are running the vulnerable program. In another example, some of the method blocks may be performed locally and some may be performed centrally.

According to the method shown in FIG. 1 an initial set of filter conditions (generated in block 103) are generalized by removing conditions (in block 105). By generalizing the filter conditions, a more general filter is generated (in block 106) and it is more difficult for attacks to bypass the filter and more attacks will be blocked.

The filter (generated in block 106) can be applied by a computing device running the vulnerable program at the point any input (such as a message or file) is received by the program, enabling the program to drop any inputs which would result in unexpected/unwanted behavior. Such inputs are referred to as 'bad inputs' and may comprise messages, files or any other type of input. The term 'bad inputs' does not imply that the input is necessarily malicious, but that the input causes the program to act in an unexpected, unplanned or undesired way. The term 'bad inputs' therefore also includes inputs which enable other malicious code to load and execute and user inputs which trigger bugs within the vulnerable program and therefore do not relate to an attack on the program. These bad inputs may also be referred to as 'exploits'. Whilst the following description may refer to the inputs (or exploits) being messages, this is by way of example only and the input may be any kind of bad input.

As described above, the filters generated may be applied on any inputs to a program. Programs can more easily cope with dropped inputs (e.g. dropped messages) than with exceptions raised later which may require the program to restart. As a result the program is more robust to attacks.

Figure 2:
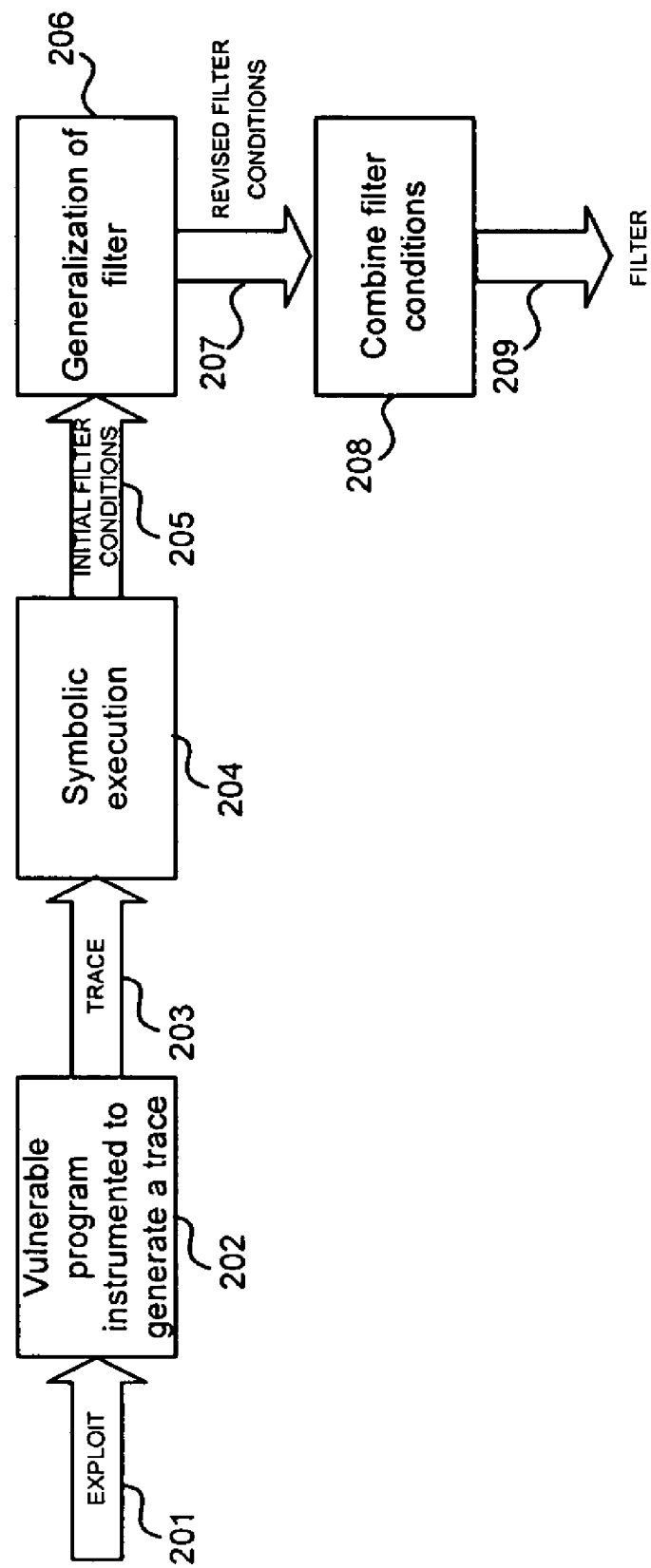
FIG. 2 is a schematic diagram of an automatic filter generation architecture.

The method of FIG. 1 may be described in more detail with reference to FIG. 2 which is a schematic diagram of an automatic filter generation architecture. An input to the method of FIG. 1 is an exploit 201 (received in block 101), which is an input that causes a program to behave incorrectly. Exploits may be generated by running a version of the vulnerable program which is instrumented to log inputs and to detect attacks. Any suitable detector may be used to detect attacks, for example, data flow integrity (DFI) enforcement, as described in the paper entitled "Securing software by enforcing data-flow integrity" by Miguel Castro, Manuel Costa, and Tim Harris and published in the Proceedings of the 7th USENIX Symposium on Operating Systems Design and Implementation (OSDI'06), Seattle, USA, November 2006. The message(s) in the sample exploit 201 are sent to a version of the vulnerable program 202 that is instrumented to generate (in block 102) an execution trace 203. In some embodiments, this version of the vulnerable program 202 may also be instrumented to detect attacks. The trace 203 contains a sequence of instructions (e.g. x86 instructions) executed from the moment the first message is received by the program to the point where the attack is detected. The instruction where the attack is detected is referred to herein as the 'vulnerability point'.

The trace 203 (generated in block 102) is used to compute an initial set of filter conditions 205 (in block 103) using symbolic execution 204. This set of filter conditions are such that the vulnerable program is guaranteed to follow the execution path in the trace when processing any message that satisfies these initial filter conditions 205, if the input is received in the same state where the trace started and the runtime environment makes the same non-deterministic choices it made during the trace (for example, the same scheduling decisions). Therefore, these initial filter conditions could be used to generate a filter that can be used to drop exploit messages without introducing false positives (i.e. where a message which does not exploit the vulnerability is dropped). However, an attacker may be able to craft exploits that are not dropped by this filter because there may be some conditions in the initial set that are not necessary to exploit the vulnerability.

In order to broaden the scope of the filter, without introducing false positives, the filter conditions are generalized 206 by computing a subset of the instructions in the trace that ensure the vulnerability can be exploited (block 104) and removing those conditions from the initial set of conditions which were added as a result of instructions which are not included within the subset (block 105). The remaining filter conditions 207 can then be combined 208 in order to generate a filter 209 (in block 106) which will block more exploits than a filter generated based on the initial filter conditions 205. This filter 209 may comprise a conjunction of all the remaining filter conditions 207. The output of the method (and the architecture of FIG. 2) may comprise this filter 209 or a snippet of assembly code that computes the filter or any other sequence of instructions that computes the filter conditions. The steps of FIG. 1, and in particular the methods of computing the subset of instructions (block 104), are described in more detail below. Alternative generalization techniques which may be used instead of, or in combination with, blocks 104 and 105 are also described.

The execution trace may be generated (in block 102) using Nirvana, a runtime framework for trace collection, developed by Microsoft (trademark) and described in a paper entitled 'Framework for Instruction-level Tracing and Analysis of Program Executions' by Sanjay Bhansali, Wen-Ke Chen, Stuart de Jong, Andrew Edwards, Ron Murray, Milenko Drinic, Darek Mihocka, and Joe Chau, and published at Virtual Execution Environments Conference, 2006. A trace generated using Nirvana comprises the sequence of x86 instructions executed by each thread and the concrete values of source and destination operands for each instruction. In other examples, alternative trace generation methods may be used. Instead of comprising a sequence of instructions executed and the concrete values of source and destination operands for each instruction, the trace may comprise the state of the processor and memory when the message is received, from which the values of the operands may be computed.

The initial set of filter conditions may be computed (in block 103) from the sample exploit 201 and the trace 203 using forward symbolic execution. Forward symbolic execution computes symbolic values for storage locations that are data dependent on the input and concrete values are computed for those that are not data dependent on the input. Initially only input bytes (i.e. the bytes in the exploit 201) have symbolic values: the byte at index i gets symbolic value $b_i$. The instructions in the trace are then executed sequentially, keeping track of the symbolic value of storage locations that are data dependent on the input, where the symbolic values are expressions whose value depends on some of the $b_i$. Instructions with at least one symbolic operand are executed symbolically and the value of the destination operand also becomes symbolic. For example, if 'input' points to a buffer with the exploit bytes, register 'eax' has symbolic value $b_0+1$ after executing:

```
movzx eax, input;
add eax, 1.
```

When all instruction operands are concrete, the instruction is executed concretely and the value of the destination operand becomes concrete.

The symbolic execution defines a total order on the instructions in the trace that is a legal uniprocessor schedule. The instructions are processed one at a time in this total order. If the next instruction to be processed has at least one source operand that references a storage location with a symbolic value, the instruction is executed symbolically. Otherwise, any storage locations modified by the instruction are marked as concrete, that is, any symbolic value these locations may have had is deleted because they are no longer data dependent on the input.

The symbolic values may be represented as trees whose interior nodes are x86 instruction opcodes and whose leaves are constants or one of the $b_i$. This particular representation is only one possible example representation, however this representation is simple to convert into executable code and its use avoids the problem of modeling x86 instructions using another language.

Symbolic execution may be described with reference to the example vulnerable code:

```
ProcessMessage(char* msg) {
    char buffer[1024];
    char p0 = 'A';
    char p1 = 0;
    if (msg[0] > 0)
        p0 = msg[0];
    if (msg[1] > 0)
        p1 = msg[1];
    if (msg[2] == 0x1) {
        sprintf(buffer, "\\servers\\%s\\%c", msg+3, p0);
        StartServer(buffer, p1);
    } }
```

This code is in C for clarity but the techniques described herein work with binary code (such as x86 assembly language), assembly code for other machines (e.g. ARM or virtual machines, such as CLR bytecode), C and other languages. In this code, the function ProcessMessage is called immediately after the message msg is received from the network. This function has a vulnerability: exploit messages can cause it to overflow buffer in the call to sprintf. An attacker can exploit this vulnerability to overwrite the return address on the stack, which can cause the program to crash or execute arbitrary code. There are usually many exploits for a vulnerability, for example, any message with the third byte equal to 0x1 followed by at least 1013 non-zero bytes is a valid exploit for this vulnerability.

A trace, which is the assembly code for the first 'if' in the example code above, is as follows:

```
mov     eax,dword ptr [msg]
movsx   eax,byte ptr [eax]
cmp     eax,0
jg      ProcessMessage+25h (401045h)
```

Since the source operand of the first instruction is concrete, the value in register eax is marked concrete. The source operand of the second instruction references the first byte in the msg array that has symbolic value $b_0$. Therefore, eax gets symbolic value (movsx $b_0$) after the instruction is executed. Since the value of register eax is now symbolic, the flags register (eflags) has symbolic value (cmp (movsx $b_0$) 0) after the compare (cmp) instruction.

Conditions may be generated by symbolic execution in three different situations:
  when a branch instruction is executed
  when an indirect call or jump is executed
  when a load or store to memory is executed with an address operand that has a symbolic value.

These three situations and the generated conditions are described in more detail below.

Whenever the symbolic execution encounters a branch that depends on the input (i.e. the branch instruction tests a flag with a symbolic value), it adds a condition to the filter to ensure that inputs that satisfy the filter conditions follow the same execution path (i.e. the execution path in the trace). If in the trace, the path is taken, the condition is one that ensures that the path is taken, and vice versa. The condition may be of the form $f_s = f_c$, where $f_s$ is the symbolic value of the flag and $f_c$ is the concrete value of the flag observed at the branch point in the execution trace. For example, if 'jz label' is executed and the zero flag has symbolic value cmp $b_0$, 0x4, the condition '$b_0$=0x4' is generated if the branch was taken in the trace or the condition '$b_0 \neq$ 0x4' is generated if the branch was not taken. No conditions are added for branches that do not depend on the input.

In an example representation, conditions may be represented as a tree of the form: (jcc f), where f is the symbolic value of eflags and a branch is dependent upon the input if the value of eflags is symbolic. If the branch is taken in the trace, Jcc is the opcode of the branch instruction. Otherwise, Jcc is the opcode of the branch instruction that tests the negation of the condition tested in the trace. For example when the last instruction in the example trace above is executed, symbolic execution generates the condition (jg (cmp (movsx $b_0$) 0)), where 'jg' is an instruction to 'jump if greater than'. If the branch had not been taken in the trace, the condition would be (jle (cmp (movsx $b_0$) 0)), where 'jle' is an instruction to 'jump if less than or equal', i.e. the opposite of 'jg'.

Symbolic execution also generates conditions when an indirect call or jump is executed and the value of the target operand is symbolic. The condition in this case is of the form $t_s = t_c$ where $t_s$ is the symbolic value of the target and $t_c$ is the concrete value of the target retrieved from the trace (before the control transfer). In an example, the condition may be represented as (je (cmp $t_s$ $t_c$)), where 'je' is an instruction to 'jump if equal'.

Similar conditions are generated when a load or store to memory is executed and the address operand has a symbolic value. These conditions are of the form $a_s = a_c$ where $a_s$ is the symbolic value of the address operand and $a_c$ is its concrete value retrieved from the trace (before the instruction is executed). In an example, the condition may be represented as (je (cmp $a_s$ $a_c$)). A technique to generate weaker conditions in this case is described in a paper by C. Cadar, V. Ganesh, P. M. Pawlowski, D. L. Dill, and D. R. Engler entitled 'EXE: Automatically generating inputs of death' published at Computer and Communications Security (CCS) in October 2006. This technique may be used to obtain a more general set of initial filter condition and may be implemented in all cases or in specific cases. In an example, the technique may be applied only to common library functions like strtok and sscanf.

An initial filter may comprise a conjunction of these initial filter conditions 205 generated (in block 103) using symbolic execution. Any input that satisfies the filter conditions can make the program follow the execution path in the trace until the vulnerability is exploited. The program may only follow the same execution path if the input is processed in the same setting as the sample exploit, that is, if the input is received in the same state where the trace started and the runtime environment makes the same non-deterministic choices it made during the trace (for example, the same scheduling decisions). Since this state is reachable and clients do not control the non-deterministic choices, the filter has no false positives.

Additionally, the symbolic or concrete values of instruction operands are equivalent across the traces obtained when processing any of the inputs that satisfy the conditions in the initial filter (in the same setting as the sample exploit). Equivalent means identical modulo different locations for the same logical objects, for example, the bases of stacks can differ and locations of objects on the heap can be different but the heaps will be isomorphic.

Having computed the initial set of filter conditions 205 (in block 103), these filter conditions are generalized, e.g. through the removal of some conditions, in order that the resultant filter catches more exploits than a filter generated from the initial set of filter conditions. A number of generalization techniques are described below including:

identification of unsafe writes
    path/precondition slicing
    symbolic summaries
    generation of alternative exploits Any implementation of the method of FIG. 1 may use one or more of these techniques and any technique may be used in isolation or in combination with any of the other generalization techniques described herein. A high level explanation of each technique is provided below, followed by a more detailed explanation of each technique.

Figure 5:
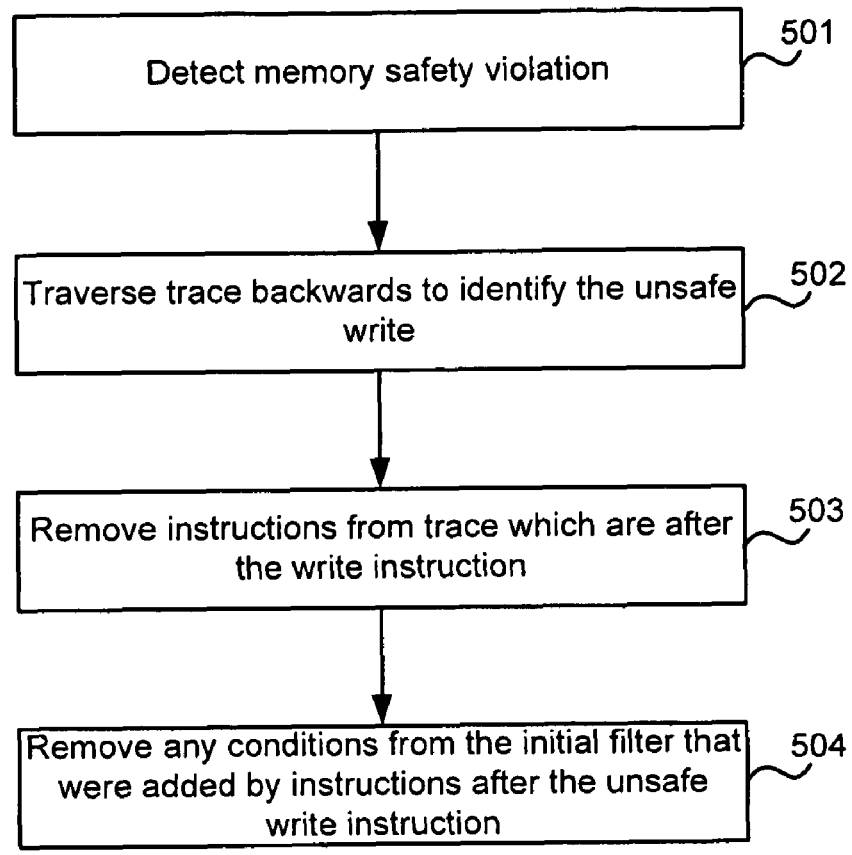
FIG. 5 is a flow diagram of a method of improving detector accuracy.

Identification of unsafe writes improves the accuracy of an attack detector because many detectors only detect an attack when an instruction observes the effect of the exploit rather than identifying the vulnerability itself. This results in the vulnerability point being identified much later in the execution and therefore the trace is longer. A longer trace includes more instructions and these additional instructions which are after the true, but unidentified, vulnerability point can lead to additional filter conditions. This technique detects unsafe writes which have caused a subsequent memory safety violation and treats the write instruction as the vulnerability point. This is described in more detail below with reference to FIG. 5.

Path slicing is a known method of program slicing, described in a paper by R. Jhala and R. Majumdar entitled 'Path slicing' and presented at PLDI in June 2005. Path slicing uses static analysis to eliminate operations which are irrelevant towards the reachability of a target location. This technique was developed for the totally different application of examination of application verification and it has not previously been applied to the problem of generating filters to block bad inputs. Additionally, path slicing has previously been applied at source level; however the methods described herein apply the techniques at assembly level. Precondition slicing uses a combination of static and dynamic analysis to remove more unnecessary filter conditions than would be possible using path slicing.

Both precondition and path slicing traverse the execution trace backwards from the vulnerability point to compute a 'path slice', which is a subsequence of the instructions in the trace whose execution is sufficient to ensure that the vulnerability can be exploited. The path slice contains branches whose outcome matters to exploit the vulnerability and mutations that affect the outcome of those branches. The initial filter is generalized by removing any conditions that were added by instructions that are not in the path slice. Precondition slicing improves the accuracy of the slicing process, and hence the filter generalization, by using not only the path in the execution trace for the sample exploit but also dynamic information from the trace (i.e. information on what actually happened when the exploit was run in the instrumented vulnerable program). This dynamic information includes the actual concrete values in the trace which may be particularly useful where the concrete values define memory locations, and therefore enables analysis to determine whether variables are overwritten. Without this information (e.g. in the static analysis of path slicing) the removal of filter conditions must be performed in a conservative manner to avoid introducing false positives (i.e. the dropping of messages which do not exploit the vulnerability). The slicing algorithm is described in more detail below with reference to FIGS. 6 and 7.

Symbolic summaries generalize the conditions captured by the symbolic execution inside common library functions. They replace these conditions by a succinct set of conditions that characterize the behavior of these functions for a broader set of inputs. These summaries may be generated automatically from a template that is written once for each library function. Preparation of the templates for library functions is worthwhile as the functions may be called by many different programs.

Generation of alternative exploits is a technique which uses the initial exploit message and the conditions obtained from symbolic execution to derive new input messages that are likely to exploit the same vulnerability. These new input messages can be checked to see if they are valid exploits (i.e. to check that they do exploit the same vulnerability) and each new exploit can be used to generate a new set of filter conditions. The final filter may then comprise a combination of the filters obtained for each exploit (i.e. the initial sample exploit and any new valid exploits). Implementation of this technique in FIG. 1 in isolation from the other generalization techniques would result in omitting blocks 104 and 105 and adding an extra block after block 106 in which a new exploit is generated. This new exploit would then be fed back into block 102. This is described in more detail below with reference to FIGS. 4 and 8.

Figure 3:
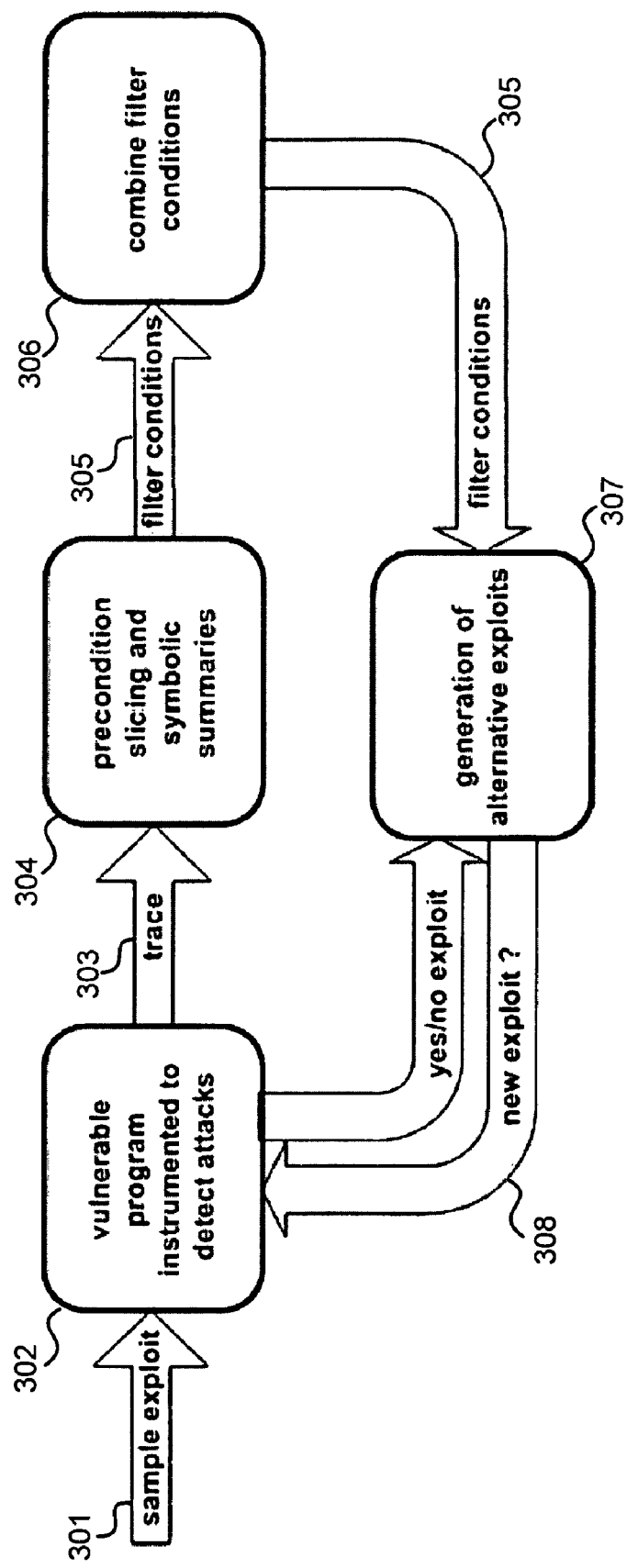
FIG. 3 is a schematic diagram of another automatic filter generation architecture.

FIG. 3 is a schematic diagram of an automatic filter generation architecture which implements many of the generalization techniques described above and FIG. 4 is a flow diagram of a corresponding method of automatic filter generation. Filter generation starts with a sample exploit 301 that identifies a vulnerability (received in block 401). As described above, the sample exploit may be obtained by running a version of the vulnerable program instrumented to log inputs and to detect attacks. When an attack is detected, the exploit messages are retrieved from the log and sent to the automatic filter generation architecture of FIG. 4. This architecture may be collocated with then instrumented vulnerable program or may be located elsewhere.

In an example DFI may be used to detect attacks on C and C++ programs but other examples may use other detectors and/or may apply the techniques described herein to programs written in safe languages. DFI detects memory safety violations, for example, format string vulnerabilities, buffer overflows, accesses through dangling pointers, reads of uninitialized data, and double frees. For each value read by an instruction in the program text, DFI uses static analysis to compute the set of instructions that may write the value. At runtime, it maintains a table with the identifier of the last instruction to write to each memory location. The program is instrumented to update this table before writes, and reads are instrumented to check if the identifier of the instruction that wrote the value being read is an element of the set computed by the static analysis. If it is not, DFI raises an exception. DFI has low overhead because most instrumentation can be optimized away with static analysis, and it has no false positives: it only raises exceptions when memory safety is violated. In an example which uses the vulnerable code listed above, a sample exploit message may start with three bytes equal to 0x1 followed by 1500 non-zero bytes and byte zero. Processing this message causes DFI to throw an exception when p1 is accessed to set up the call stack for StartServer because p1 has been overwritten.

The messages in the sample exploit 301 are sent to a version of the vulnerable program 302 that is instrumented to generate an execution trace (in block 402) and may also be instrumented to detect attacks. As described above, Nirvana may be used to generate an execution trace 303. If the version of the vulnerable program 302 is instrumented both to generate an execution trace and to detect attacks, the program 302 may check that the sample exploit is valid (block 403), and only send the execution trace 303 to a module 304 that runs the precondition slicing algorithm if the exploit is valid. In another example this step (block 403) may be omitted (as indicated by the dotted arrow in FIG. 4). In a further variation, two versions of the vulnerable program may be provided, one which is instrumented to generate an execution trace and one which is instrumented to detect attacks or otherwise check that an exploit is valid.

As described above, the trace 303, in this example, contains the sequence of x86 instructions executed from the moment the first message is received by the vulnerable program to the point where the attack is detected (i.e. the last entry in the trace is the instruction which is the vulnerability point). As described above, in other examples, the trace may comprise other languages or instruction sets and x86 is used by way of example only. The trace obtained with the sample exploit described above, contains the instructions up to the call to sprintf, the instructions inside sprintf, and the remaining instructions up to the vulnerability point, which is the push of p1 onto the stack.

The module 304 that runs the precondition slicing algorithm uses symbolic execution (e.g. as described above) to generate an initial set of conditions for the filter (block 404), i.e. it replaces the concrete value of each byte in the sample exploit by a symbolic value $b_i$, performs forward symbolic execution along the trace and adds a condition to the filter for each branch that depends on the input. Conditions may also be added in other situations, as described above. The initial set of conditions for the example trace is:

$$b_0 > 0 \land b_1 > 0 \land b_2 = 1 \land b_{1503} = 0 \land \forall_{2 \leq i < 1503} b_i \neq 0$$

The vulnerable program is guaranteed to follow the execution path in the trace when processing any message that satisfies these initial filter conditions. Therefore, this filter can be used to drop exploit messages without introducing false positives. However, the attacker can craft exploits that are not dropped by this filter because there are some conditions that are not necessary to exploit the vulnerability. For example, the conditions on $b_0$ and $b_1$ are not necessary and exploits with both shorter and longer sequences of non-zero bytes starting at index three can exploit the vulnerability.

The module 304 may also replace the conditions generated for some library functions, like sprintf in the example, by symbolic summaries (block 405) that contain the conditions on the function arguments that cause it to violate memory safety. These summaries may be generated automatically from a template that is written once per library function, and this is described in more detail below. In the example above, the generation of symbolic summaries may determine that buffer has size 1024 bytes, and that any sequence with at least 1013 non-zero bytes pointed to by msg+3 will lead to a memory safety violation independent of the value of $p_0$. As a result, the filter conditions 305 after this step are:

$$b_0 > 0 \land b_1 > 0 \land b_2 = 1 \land \forall_{2 \leq i < 1016} b_i \neq 0$$

Having computed symbolic summaries (in block 405) precondition slicing may be performed (block 406). Alternatively, computation of symbolic summaries may not be performed (as indicated by the dotted arrow in FIG. 4), however use of both techniques may be more efficient. As described above, precondition slicing uses a combination of static and dynamic analysis to remove unnecessary conditions from the filter. In the example, it is able to remove the conditions on bytes $b_0$ and $b_1$ producing the optimal filter (in block 407 and module 304):

$$b_2 = 1 \land \forall_{2 \leq i < 1016} b_i \neq 0$$

The method may stop at this stage and the filter may be used to drop incoming messages to the vulnerable program.

The filter may be further optimized (i.e. generalized) by repeating the process with alternative exploits of the same vulnerability that cause the program to follow different execution paths. The filter conditions 305 are sent to a module 307 that generates alternative exploits (block 408). This module uses the sample exploit 301 and the filter conditions 305 to generate new input messages that are likely to exploit the same vulnerability. The new input messages 308 are sent to the instrumented vulnerable program to check if they are valid exploits (block 409). If they are valid, the process (blocks 402, 404-406) is repeated with the new exploit messages. Otherwise, the module 307 generates more new input messages (block 408). The set of filter conditions obtained with each exploit may be combined into an efficient final filter by one of the modules, e.g. module 306.

The initial filter generated using this method can be deployed automatically a few tens of seconds after a new vulnerability is identified and can be subsequently updated as the analysis generalizes the filters. As described above, the methods may be implemented on the computing device running the vulnerable program or may be implemented centrally. Where the method is implemented centrally (e.g. be the vendor of the program), the initial filter and subsequent updates may be distributed to those computing devices running the vulnerable program. Where the method is implemented locally (i.e. on the device running the vulnerable program) any filters generated may be distributed to other devices running the same vulnerable program, either directly or via a central entity (e.g. via the vendor of the program). Where filters are shared between computing devices, this may be implemented across a network and/or within an enterprise (or more widely).

The iterative method may also be used where there is no module 307 which generates alternative exploits, by running the filters with vulnerable programs that are instrumented to detect attacks, with DFI or another detection algorithm, and to log inputs. The filter may be refined when an attack that bypasses the filter is detected by DFI.

Use of methods described herein improves the availability and reliability of the vulnerable program significantly until the software vendor issues a patch for the vulnerability, which can take many days. Alternatively, the need for a patch may be negated.

As described above, detector inaccuracy can lead to filters with unnecessary conditions because it increases the length of the traces used during symbolic execution. A technique may therefore be used which detects unsafe writes and this can be described with reference to FIG. 5. On detection of a memory safety violation (block 501), the trace is traversed backwards to find the unsafe write (block 502). This write instruction becomes the vulnerability point and any subsequent instructions may be removed from the trace (block 503) although dependent on whether the trace is used subsequently for any purpose, this truncation of the trace may not be necessary. Any conditions added by instructions that appear later in the trace than the unsafe write (i.e. later than the new vulnerability point) are removed from the initial filter or set of initial filter conditions (block 504).

This analysis may be insufficient to identify the vulnerability for attacks that corrupt internal data structures in libraries. For example, a class of attacks corrupts the heap management data structures in the C runtime libraries to write anywhere in memory. Since DFI does not check reads inside libraries, it detects the attack only when an instruction reads data produced by this write. In such a situation, the analysis may analyze the trace to find the instruction that first corrupts the heap management data structures. This analysis may comprise traversing the trace backwards to find the unsafe write (as in block 502). If this write was executed by one of the heap management functions (e.g. malloc), the trace is then traversed forward from the beginning to find the first read inside a heap management function (e.g. malloc, calloc or free) of a value written by an instruction outside these functions. The instruction that wrote this value (which is outside one of the identified heap management functions) becomes the vulnerability point and any conditions added by later instructions in the trace are removed from the initial filter or initial set of filter conditions. Whilst this example relates to heap management data structures, the same technique could be applied to other library functions.

As described above, both path and precondition slicing traverse the execution trace backwards from the vulnerability point to compute a path slice and then the initial filter (or initial set of filter conditions) are generalized by removing any conditions that were added by instructions that are not in the slice. The path slice is therefore a subsequence of the instructions in the trace. A slicing algorithm can be described in more detail with reference to the pseudo-code given below and to FIGS. 6 AND 7. The overall algorithm as shown in the pseudo-code and in FIGS. 6 AND 7 applies whether static analysis (as in path slicing) or a combination of static and dynamic analysis (as in precondition slicing) is used. The differences arise in how the particular method steps are implemented and these are described in detail below.

The algorithm receives as inputs a trace 601, a representation of the program code 602, and alias analysis information 603. The trace 601, which may be generated automatically from an exploit, has a sequence of entries for each instruction executed by the vulnerable program following the receipt of the first message of the sample exploit. Each entry in the trace has a pointer to the corresponding instruction in the code, the memory addresses or register names read and written by the instruction in the execution trace, and the symbolic or concrete values read and written by the instruction in the symbolic execution. As described above, the trace 601 may be generated using Nirvana and symbolic execution.

The representation of the program code 602 comprises details of how the vulnerable program is executed on a processor. In an example, this representation may be obtained by using the Phoenix compiler framework, (as described at http://research.microsoft.com/phoenix/phoenixrdk.aspx), to raise the program binary to an intermediate representation very similar to the x86 instruction set.

The alias analysis information 603 may be obtained from DFI, in which the analysis is performed during the compilation of the program from source code. The alias analysis (whether obtained from DFI or otherwise) generates two relations on operands of instructions in the program code: MayAlias(o1, o2) iff the operands o1 and o2 may refer to overlapping storage locations in some execution, and MustAlias(o1, o2) iff the operands o1 and o2 always refer to the same storage location in all executions. These relations are conservative approximations, such that MayAlias may include pairs that never overlap and MustAlias may not include pairs that always overlap. The alias information 603 comprises these MayAlias and MustAlias relations. The alias relations may be written to disk during compilation and later read by the precondition slicing algorithm together with the binary. The alias analysis is used in the MayWrite, WrittenBetween, UpdateWritten and MayWriteF functions in the example pseudo-code given and described below.

The slicing algorithm maintains the following data structures:

cur is the trace entry being processed slice is a list of trace entries that were added to the path slice. Initially, it contains the entry for the vulnerability point instruction.

live keeps track of dependencies for instructions in slice and contains a pointer to the corresponding operand in the code. Where precondition slicing is used, live also contains dynamic information. It contains entries for operands read by these instructions in slice that have not been completely overwritten by instructions that appear earlier in the trace. Entries in live, also contain the register or memory address from which the instruction read the operand in the execution trace, and the symbolic or concrete value of the operand read by the instruction in the symbolic execution. Entries also keep track of portions of the operand that have been overwritten by instructions that appear earlier in the trace. Initially, live contains the operands read by the instruction at the vulnerability point.

Figure 6:
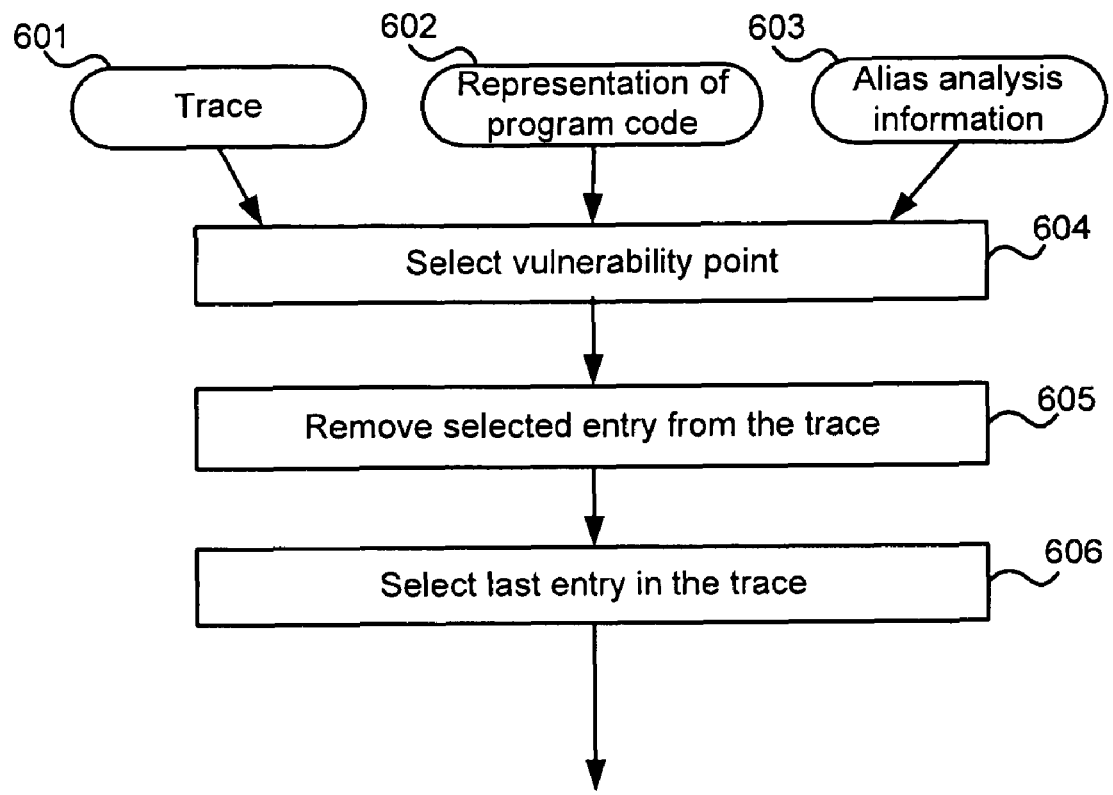
FIGS. 6 and 7 are a flow diagram of a method of program slicing.
Figure 7:
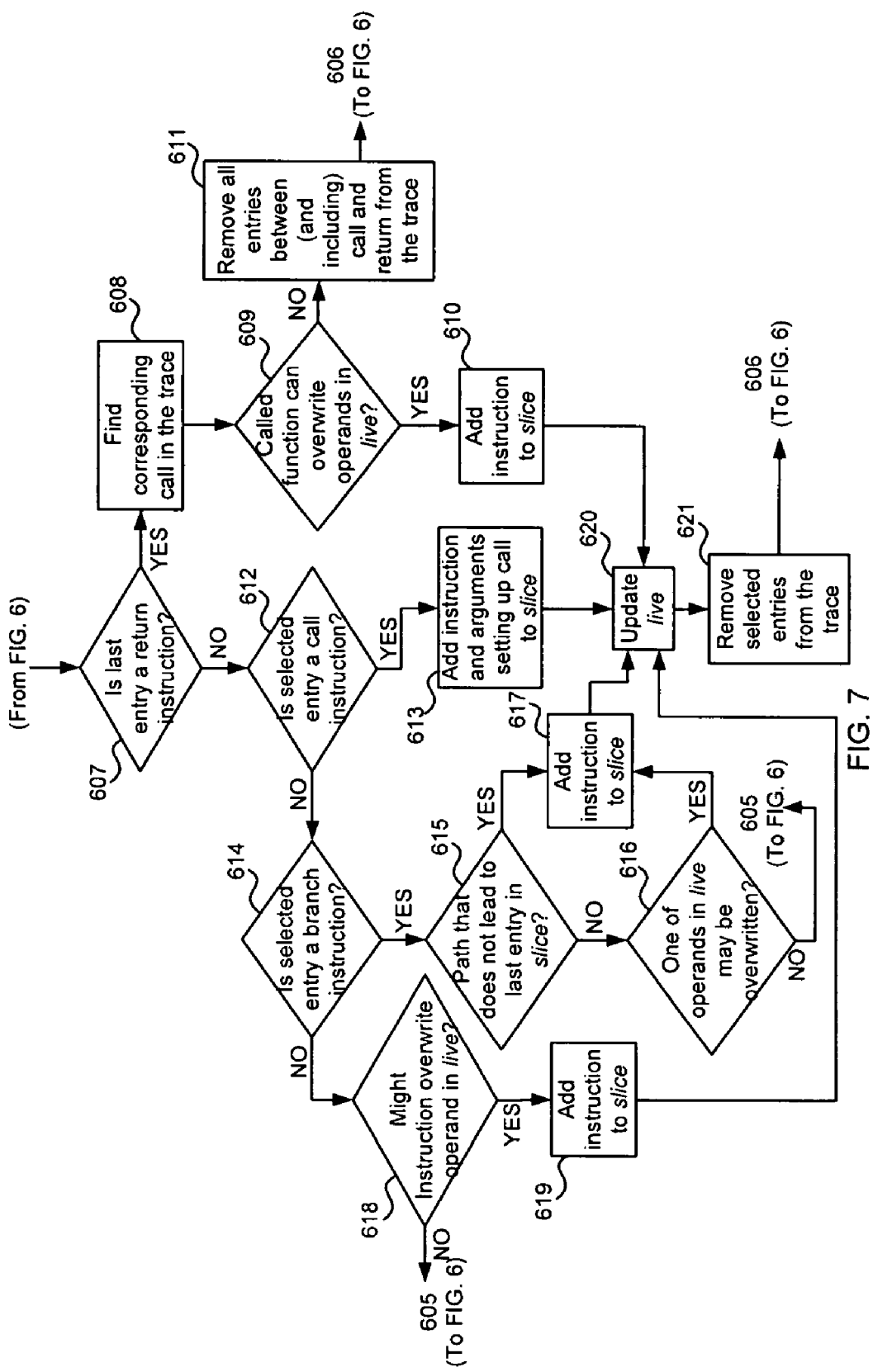

The following pseudo-code describes the slicing algorithm which is also shown in the flow diagram of FIGS. 6 AND 7:

```
ComputeSlice( ) {
    while (!trace.IsEmpty) {
        cur = trace.RemoveTail( );
        if (cur.IsRet) {
            call = trace.FindCall(cur);
            if (MayWriteF(CalledFunc(call), live))
                Take(cur);
            else
                trace.RemoveRange(cur,call);
        } else if (cur.IsCall) {
            Take(cur);
            foreach (e in trace.CallArgSetup(cur)) {
                Take(e);
                trace.Remove(e);
            }
        } else if (cur.IsBranch) {
            if (!Postdominates(slice.head,cur)
                    || WrittenBetween(cur, slice.head))
                Take(cur);
        } else {
            if (MayWrite(cur, live))
                Take(cur);
        }
    } } }
void Take(cur) {
    slice.AddHead(cur);
    live.UpdateWritten(cur);
    live.AddRead(cur);
}
```

The algorithm iterates through the trace backwards deciding what instructions to take into the slice. Return, call, and branch instructions are treated in a special way but other instructions are taken if they may overwrite the operands in live.

Initially the algorithm selects the last entry in the trace which is the vulnerability point (block 604) and this instruction is added to the path slice (i.e. data structure slice). The operands read by this instruction are added to live. The vulnerability point is then removed from the trace (block 605). The algorithm then selects the last entry in the trace (block 606) and this selected entry is maintained in data structure cur. If this selected entry (cur) is a return instruction ('Yes' in block 607), the algorithm finds the corresponding call in the trace (block 608) and adds the return instruction into slice if the called function can overwrite operands in live ('Yes' in block 609 and block 610); otherwise, none of the instructions in the called function are taken into the path slice and all the entries between the return and the call, including the return and call instructions themselves, are removed from the trace (block 611). This determination (in block 609) of whether the called function can overwrite an operand in live is implemented in the pseudo-code by the function 'MayWriteF'. When the return is taken (i.e. the return instruction is added to slice), the algorithm iterates through the instructions in the called function.

Call instructions ('No' in block 607 and 'Yes' in block 612) are always added into slice (block 613) unless they were already removed when processing the corresponding return (i.e. in block 611). The instructions that set up the arguments for the call are also added into slice (also in block 613).

Branches are added into slice (in block 617) if the direction of the branch is relevant to the value of the operands in live, that is, if there is some path originating at the branch instruction that does not lead to the last instruction added to the slice ('Yes' in blocks 614 and 615), or if one of the operands in live may be overwritten in a path between the branch and the last instruction added to the slice ('Yes' in blocks 614 and 616 and 'No' in block 615).

Instructions which are not call, return or branch instructions ('No' in blocks 607, 612 and 614) are added to the slice (in block 619) if they may overwrite the operands in live ('Yes' in block 618). This uses the MayAlias relations, described above. In the pseudo-code, this is implemented by the function 'MayWrite'. When static analysis is used, MayWrite starts by computing the set L with all operands in the code that may alias at least one operand with an entry in live and returns true (i.e. that they may overwrite one of the operands in live) if any of the operands written by cur is in L and false otherwise. MayWriteF described above (in block 609) operates similarly for functions, i.e. it checks the intersection between L and the set of all operands written by instructions in the function or any of the functions it calls.

The procedure 'Take' adds the trace entry of each instruction that is taken to slice (as in blocks 610, 613, 617 and 619). In addition, it updates live to reflect the writes and reads performed by the instruction in the trace (block 620). This is shown in the pseudo-code, in which UpdateWritten records what locations were written by the instruction in cur and AddRead adds the operands read by cur to live recording the location they were read from and their value. Having added the instruction to slice, the instruction is removed from the trace (block 621) and the method is repeated for the new last entry in the trace. If static analysis is used, the UpdateWritten method, in addition to recording what locations were written by the instruction in cur, also removes an operand from live if MustAlias holds for the operand and any of the operands written by the current instruction.

In the above example, instructions after cur are removed from the trace (e.g. in blocks 605 and 621), however this is only one possible implementation. Other methods may be used to keep track of the instruction that is currently being processed (cur) without removing instructions from the trace.

The slicing algorithm can be improved by using dynamic analysis, in combination with static analysis, which takes advantage of information from the actual execution which is stored in the trace. When static and dynamic analysis are combined (which is the technique referred to herein as 'precondition slicing'), the algorithm still operates as shown in FIGS. 6 AND 7 and the pseudo-code above, however the called methods (e.g. UpdateWritten, AddRead, MayWrite, MayWriteF, PostDominates and WrittenBetween) may operate differently. The combination of static and dynamic analysis provides improved precision, i.e. a slice with less instructions and a filter with less conditions while still ensuring no false positives. The extra precision means that MayWrite, MayWriteF, WrittenBetween return true less often and PostDominates returns true more often. Aspects of the methods when dynamic analysis is used in combination with static analysis are described in more detail below.

The information from the symbolic execution ensures the following invariant: let F be the intermediate filter that contains all the conditions in the initial filter that were added by instructions up to cur(i.e. instructions which are before cur in the trace) and the conditions added by instructions in slice (which are a subsequence of the instructions which were after cur in the original trace). Then all the execution paths obtained by processing inputs that match F (in the same setting as the sample exploit) execute the sequence of instructions in slice and the source operands of each of these instructions have equivalent concrete or symbolic values across these paths. Dynamic information is then used to remove entries from live sooner (i.e. at an earlier stage in the backwards traversal of the execution trace) than would be possible using static analysis and also enables more entries to be removed than would have been possible with only static analysis. In this improved version of the algorithm, the method UpdateWritten removes an entry from live when the storage location that the operand was read from in the execution trace is completely overwritten by earlier instructions in the trace. Since live already captures the dependencies of the instructions that overwrote the removed entry, the entry no longer affects the reachability of the vulnerability at this point in any path obtained with inputs that match F.

This use of dynamic information to improve the slicing algorithm can be illustrated using the following example of vulnerable code:

```
ProcessMessage(char* msg, char *p0, char* p1) {
    char buffer[1024];
    if (msg[0] > 0)
        *p0 = msg[0];
    if (msg[1] > 0)
        *p1 = msg[1];
    if (msg[2] == 0x1 && *p0 != 0) {
        sprintf(buffer, "\\servers\\%s\\%c", msg+3, *p0);
        StartServer(buffer, p1);
} }
```

The same sample exploit as described above may be used which starts with three bytes equal to 0x1 followed by 1500 non-zero bytes and byte zero. If p0 and p1 point to the same storage location but this fact cannot be determined by the static analysis, the static analysis would not be able to remove any condition from the initial filter. Use of the dynamic analysis however, enables the slicing algorithm to remove the condition $b_0>0$ from the initial filter, as follows: when *p1=msg[1] is processed, the operand for *p0 is removed from live because its storage location is overwritten; therefore, the branch that checks msg[0]>0 is not added to the slice.

The function MayWrite checks if an instruction may overwrite an operand in live (as in block 618) and a combination of static and dynamic analysis may be used to implement this function. As described above, MayWrite starts by computing the set L with all operands in the code that may alias at least one operand with an entry in live. According to the static analysis, MayWrite should return true if any of the operands written by cur is in L and false otherwise. An additional check can be performed using dynamic information which improves accuracy: cur is not added to slice if its execution did not write over the storage locations of any of the operands in live and its target address is determined by concrete values of operands in live. This preserves the invariant because the dependencies captured in live ensure that cur cannot affect the value of the operands in live in any path obtained with inputs that match F, so it is not relevant to reach the vulnerability. In another example, the symbolic values of the operands in cur may be used in live.

In an example implementation, the instructions in the basic block of cur may be iterated through to check if the target address of cur is determined by concrete values of operands in live. If all operands read by an instruction must alias an operand with a concrete value in live or the result operand of a previous instruction in the basic block, the instruction is executed with the concrete values and the concrete value of the destination operand is recorded. If a concrete value for the target address of cur can be computed, cur is not added to slice. Alternatively, a more general analysis of all paths leading to cur may be performed and this may improve precision further.

This behavior of MayWrite which uses dynamic analysis can be described with reference to the following example vulnerable code:

```
ProcessMessage(char* msg, char *p0, char* p1) {
    char buffer[1024];
    if (msg[0] > 0)
        *p0 = msg[0];
    if (msg[1] > 0)
        *p1 = msg[1];
    if (msg[2] == 0x1 && *p0 != 0 && p1 != p0) {
        sprintf(buffer, "\\servers\\%s\\%c", msg+3, *p0);
        StartServer(buffer, p1);
    }
}
```

As with the previous example, if p0 and p1 point to different locations but static analysis cannot determine this fact, static analysis cannot remove any conditions from the original filter. However, through use of dynamic analysis, the condition $b_1>0$ can be removed as follows: *p1=msg[1] is not taken because it does not overwrite any operand in live and p1 is in live. So the branch that checks msg[1]>0 is not taken.

MayWriteF checks whether a function may write over any operand in live. It computes the intersection between the set of all operands the function may modify and L. If the intersection is empty, the function is not added to slice. Otherwise, an additional check is performed for library functions whose semantics are known, which uses dynamic analysis. A library function is not added to slice if the locations it writes are determined by the concrete values of operands in live and it did not write over any operand in live in the trace. For example, the call memcpy(dst, src, n) is not added to slice if the values of dst and n are constants or are determined by the concrete values of operands in live, and it did not overwrite any operand in live.

There are two checks to determine whether to add a branch to the slice (blocks 615 and 616 in FIG. 7). The first one checks if the last instruction added to the slice is a postdominator of the branch, i.e. whether all paths from the branch to the function's return instruction pass by the last instruction added to slice (also referred to as 'slice.head'). If not, the branch is added to the slice to capture in live the dependencies necessary to ensure the branch outcome in the trace. Otherwise, the execution paths might not visit the instructions in slice. Static analysis may be used to determine postdominance but first a check, which uses dynamic analysis, is performed to determine if the outcome of the branch is already decided given the concrete and symbolic values of operands in live. If this is the case (i.e. the outcome is already decided), the branch is not added to the slice. This is similar to the techniques described above to improve the accuracy of May-Write but symbolic operand values and the conditions added by instructions already in the slice are used. If the branch flag is symbolic, a check is performed to see if the conditions already in the slice imply the branch condition or its negation. This preserves the invariant because, when the branch is not added to slice, the dependencies captured in live already ensure the appropriate branch outcome to reach the vulnerability in any path obtained with an input that matches F.

WrittenBetween implements the second check to determine whether or not to take a branch. It returns true if there is some path in the code between the branch and the last instruction added to the slice where some operands in live may be overwritten. This check may be performed by traversing the control flow graph between the branch and slice.head in depth-first order. The check iterates over the instructions in each basic block visited. MayWrite (or MayWriteF for function calls) is used to determine if the instructions in the basic block can modify operands in live. The concrete values of operands in live are also used to improve the accuracy of the analysis in a similar manner to that described above.

As described above, symbolic summaries may be used to generalize the conditions captured by the symbolic execution inside common library functions. This improves the generalization because removing conditions added by instructions inside library functions is otherwise difficult and without alias information all the instructions in these functions are usually added to the slice. The symbolic summaries are generated using knowledge about the semantics of common library functions such that they characterize the behavior of a library function as a set of conditions on its inputs. The summaries may be generated automatically from a template that is written once per library function and may be used to replace conditions extracted from the trace. There are two cases depending on whether the vulnerability point is inside a library function or the library function is called in the path towards the vulnerability and these are discussed separately below.

In the first case, where the vulnerability point is inside a library function, it is not necessary to characterize the full behavior of the function because what happens after the vulnerability point is not important. Therefore, in this first case, the symbolic summary is simply a condition on the arguments of the function that is true exactly when the vulnerability can be exploited. The conditions in a symbolic summary may be generated from a template (which depends on the library function) using a combination of static and dynamic analysis. The analysis determines the symbolic or concrete values of function arguments and may also determine the sizes of the objects pointed to by these arguments. In an example if the vulnerability is a buffer overflow in the call memcpy(dst, src, n), the summary will state that the size of the object pointed to by dst must be greater than or equal to n. To generate this condition, the analysis determines the concrete or symbolic values for n and for the size of the object pointed to by dst. The value for arguments like n is readily available from the trace entry for the corresponding push instruction. Where the value of dst is allocated dynamically, the trace may be traversed backwards to where the value is allocated and conditions placed on the arguments that affect that dynamic allocation.

To determine the size of the object pointed to by an argument, the analysis traverses the trace backwards from the function call to the point where the object is allocated. For objects that are allocated dynamically using calloc, malloc, or realloc, the analysis obtains the concrete or symbolic values of the arguments passed to these allocators to compute an expression for the object size. For objects whose size is known statically, the analysis obtains the object size from the representation of the code (as in 602). During this trace traversal, the analysis builds an expression for the offset between the argument pointer and the start address of the object. The expression for the size used in the condition is equal to the object size minus this offset.

It is harder to compute symbolic summaries for functions in the printf family because they have a variable number of arguments with variable types, but these functions are involved in many vulnerabilities. Again two cases may be distinguished: when the format string depends on the input and when it is known statically. In the first case, only those calls that receive no arguments beyond the format string are considered, which is the common case with format string vulnerabilities. The analysis generates a summary with a condition on the symbolic values of the bytes in the format string. This condition is true when the format string contains valid format specifiers or when its size (after consuming escape characters) exceeds the size of the destination buffer for functions in the sprintf family. In the second case, when the format string does not depend on the input, the most common vulnerability is for a function in the sprintf family to format an attacker-supplied string into a destination buffer that is too small (as in an earlier example described above). The summary for this case is a condition on the sizes of the argument strings. The analysis computes the bound on these sizes by parsing the static format string using the same algorithm as printf, processing any arguments that do not depend on the input, and determining the size of the destination buffer (as described above).

In the case where the vulnerability point is within a library function (the first case), the filter conditions generated using symbolic summaries may be combined with filter conditions generated using symbolic execution and in some implementations path and/or precondition slicing. The filter conditions generated using symbolic execution and/or path slicing and/or precondition slicing are generated using the call for the particular library function with the vulnerability as the vulnerability point. Whilst the conditions generated using symbolic summaries could be used in isolation of other filter conditions, this could introduce false positives, for example, the filter conditions from use of symbolic summaries do not necessarily guarantee that the library function is called.

Use of symbolic summaries, in the case where the vulnerability point is within the library function, improves the generation of a filter to detect and discard bad input before it is processed and in some cases may enable generation of optimal filters which otherwise would be infeasible. Therefore, services can keep running correctly under attack. An alternative technique is to patch the code by adding a check before the library call, however when the check fails it is hard to recover and furthermore, adding the check may require keeping a runtime structure mapping objects to their sizes. This is not needed by symbolic summaries because they are specific to a particular execution path (i.e. the one defined by the other conditions in the filter).

For library functions that are called in the path towards the vulnerability, (the second case), a second type of symbolic summary is generated. In the following example:

---
if (stricmp(s,"A string") == 0)
 Vulnerability( );
--- the vulnerability is reachable if the attacker supplied string equals "A string" after both are converted to lowercase. The conditions that are extracted automatically from a sample execution of stricmp will only capture a particular value of s that satisfies the comparison. Whilst techniques described below may be used to generate executions with alternative inputs to generalize the filters, it would require at least $2^8$ inputs (where 8 is the size of "A string") to generate a filter that can block all the attacks that can exploit the vulnerability. If however, the conditions for the execution of stricmp in the trace are replaced by the summary $$(s[0]=A\_s[0]=a) \wedge \ldots \wedge (s[8]=G\_s[8]=g) \wedge s[9]=0$$

it is possible to capture succinctly all values of s that can be used to exploit the vulnerability. Since the vulnerability is not inside these functions, an alternative would be to call them directly in the filter, rather than to use symbolic summaries of this second type. In an example, such symbolic summaries may only be generated for functions in the middle of the path if they have no side effects (i.e. if they compute their return value but only modify their local variables in doing so). Otherwise the function is called directly.

Whilst the generation of symbolic summaries is described above as relating to common library functions, their use may be applied to any function. Use of symbolic summaries can reduce significantly the number of irrelevant conditions in a filter because library functions often contain a lot of instructions, each of which may result in generation of a condition in symbolic execution.

Figure 4:
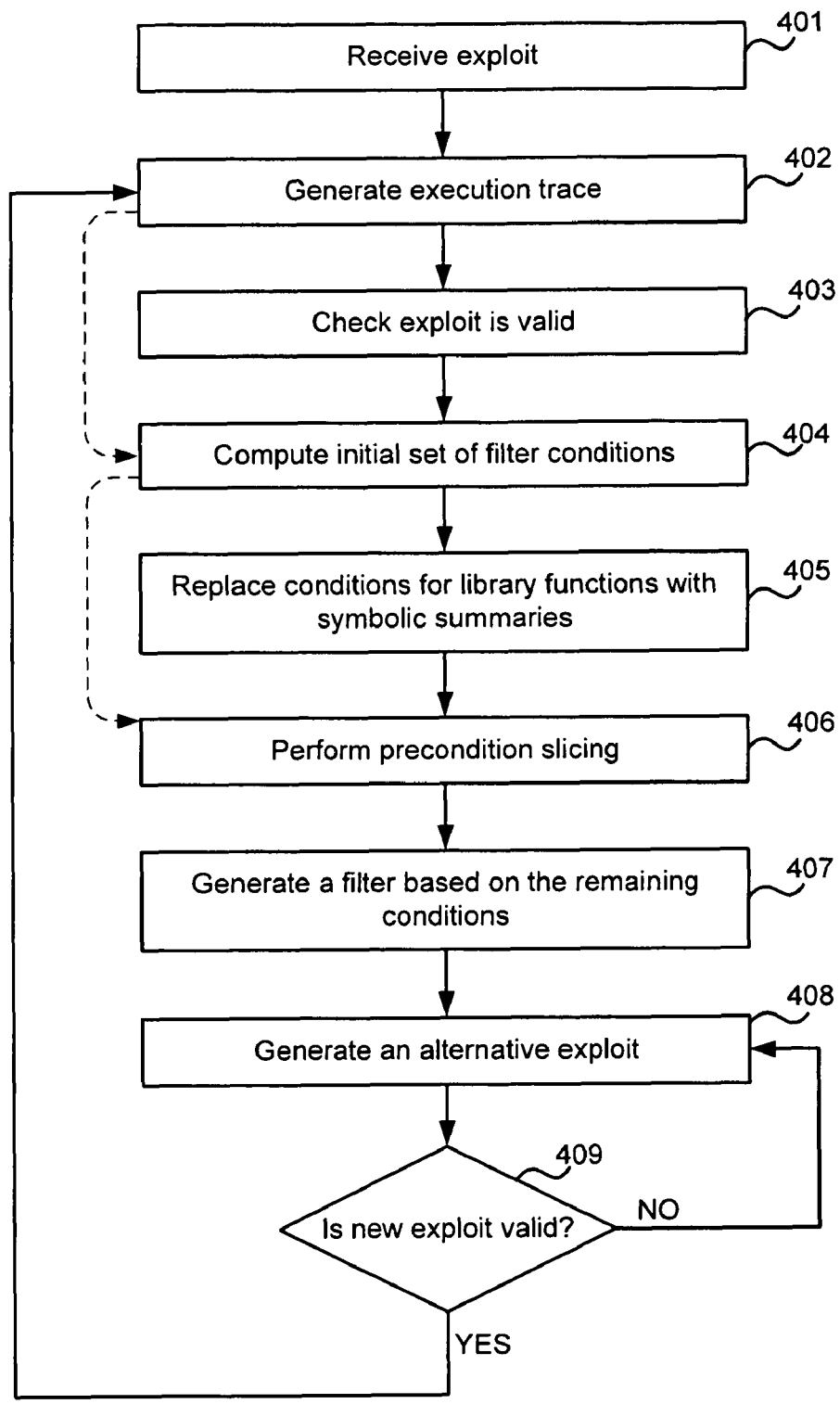
FIG. 4 is a flow diagram of another example method of automatic filter generation.

The fourth of the generalization techniques involves searching for alternative exploits of the same vulnerability (block 408 in FIG. 4). These new exploits, once found, can be used to obtain new execution traces (block 402) and then the algorithms described above can be used to compute a new filter (block 407). A disjunction of the filters obtained from the different execution traces will catch more exploits than any of the filters used alone. As described above, the search for all possible exploits may be time consuming and therefore an initial filter may be deployed and then updated when additional exploits and their filters are computed.

Figure 8:
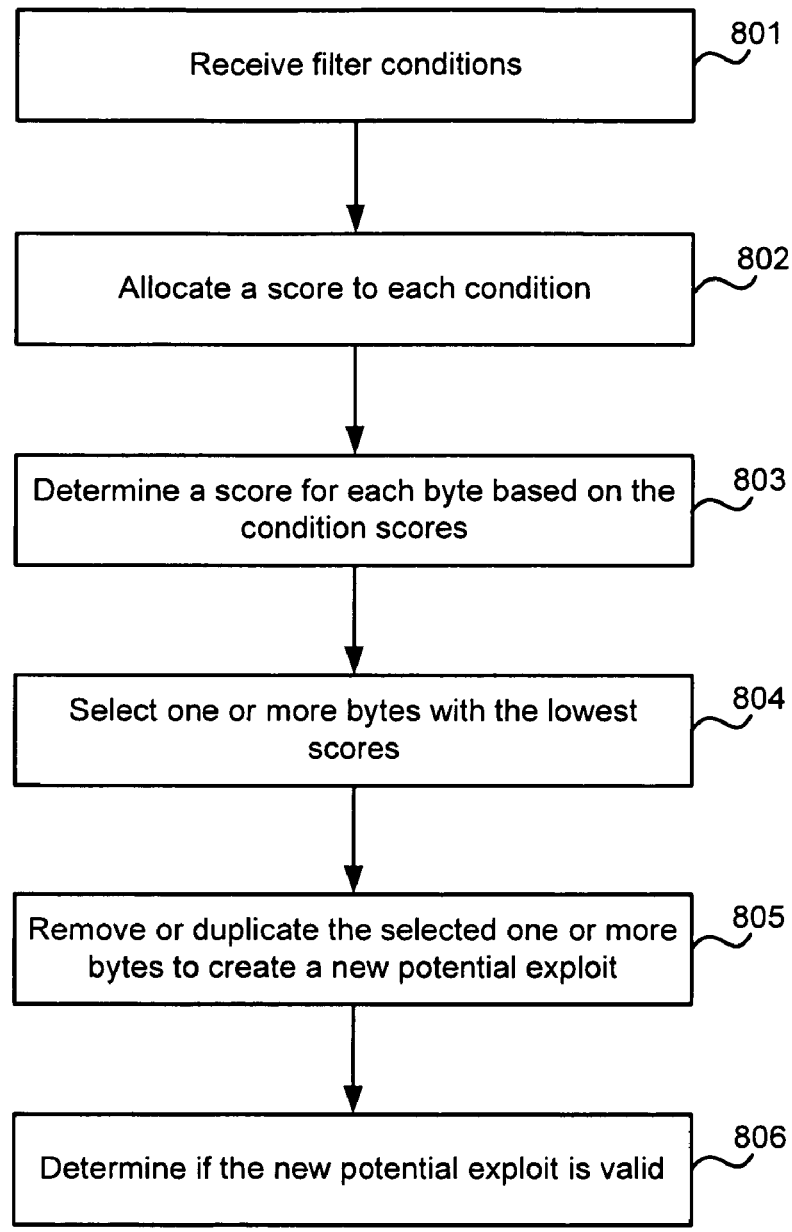
FIG. 8 is a flow diagram of an example method of generating alternative exploits.

FIG. 8 is a flow diagram of an example method of generating alternative exploits by removing or duplicating bytes in the original exploit messages. This strategy is fast and easy to parallelize. The bytes are selected to be removed or duplicated using an heuristic based on the filter conditions.

A set of filter conditions are received (block 801) and a score is given to each condition in the set of filter conditions based on the filter conditions (block 802). In an example, the score for a condition is equal to the total number of bytes in all conditions divided by the number of bytes that are referenced in conditions added by the same instruction. In an example, if condition C is added by the instruction with address A and it references 10 bytes from the input, and the total number of bytes referenced in all conditions is 1000. The score is 1000/10=100. High scores mean that the condition is specialized (i.e. it only applies to a small number of bytes) whilst low scores mean that it is applied to many bytes.

Each byte is then given a score which is computed based on these condition scores (block 803). In an example, the score for a byte is equal to the sum of the scores of the conditions it appears in, e.g. if the $1^{st}$ byte appears in three conditions, its score is the sum of the scores of those three conditions. One or more bytes with the lowest scores are then selected (block 804) for removal or duplication (in block 805). Bytes with the lowest scores are selected because they are likely to be filler bytes in buffer overflow exploits. A new potential exploit is generated (in block 805) by removing or duplicating the selected bytes and this potential exploit is checked (block 806) to see whether it is a valid exploit for the particular vulnerability. As described above (and shown in FIG. 3), this check may be performed by sending the potential new exploit to a version of the vulnerable program that is instrumented to detect attacks. If the detector signals that the exploit is valid, the filter generation process for the new exploit can be repeated. When using symbolic summaries for the library function with the vulnerability (as described above), the vulnerable program may be instrumented to signal success when the call site with the vulnerability is reached. If the exploit is not valid, the detector does not raise an exception and instead this may be detected using a watchdog that checks if all threads in the vulnerable program are idle. This avoids having to wait for a large timeout.

In an embodiment, the method may first select bytes for removal rather than duplication (in block 805). If after removing a byte the resulting message is not a valid exploit (as determined in block 806), that byte may be retained and another one selected for removal. This process may be repeated until the method has tried to remove all bytes or the message size is lower than a bound from a symbolic summary. Then, new exploits may instead be generated by duplicating bytes in the original exploit message (i.e. that received in block 801). Another byte is selected for duplication if duplication of a first byte did not obtain an exploit or if there are bytes in the resulting exploit message that are not read by the vulnerable program. The method may be stopped after it has tried to duplicate all bytes.

Having generated filters for each alternative exploit, these may be combined to obtain the final filter. In a first example, this final filter may be the disjunction of all filters. However, this can result in a final filter with high overhead. In another example, the conditions applied to each byte index by each filter may be compared. A common structure is a set of byte indices in the beginning of a message that have the same condition in all filters. These are typically followed by sequences of byte indices that have different lengths in different filters but have the same conditions applied to each byte in the sequence in each filter. There may be several of these sequences. Typically, they are followed by terminator bytes with the same conditions in each filter. If this structure is identified, it can be used to generate an efficient final filter. In this case, the final filter has the conditions for the initial bytes followed by loops that check the conditions on the variable length byte sequences, and conditions that check the terminator bytes.

The final filter may be an x86 executable. It is straightforward to convert the conditions generated during symbolic execution into executable code. A simple stack-based strategy may be used to evaluate each condition and a short circuit evaluation of the conjunction of the conditions. The size of the stack may be bounded by the depth of the trees in the conditions and filters only access this stack and the input messages. Therefore, filters are guaranteed to run in bounded time and to use a bounded amount of memory.

The filters generated using the methods described herein have no false positives by design: all the messages they block can exploit the vulnerability. The lack of false positives is important if the filter generation and implementation is to be performed automatically. The filters generated using the methods described herein may have no false negatives for some vulnerable programs, i.e. the generated filters block all the attacks that can exploit the vulnerabilities in some programs. Whilst the filters for the some other vulnerabilities may fail to block some exploits. By combining the techniques described above with techniques to compute weakest preconditions, false negatives may be further reduced.

In some deployment scenarios, it is easy to reduce filter generation times by exploiting parallelism. Since iterations in the filter generation process are independent, it can be parallelized by assigning each iteration to a different processor. For example, a large software vendor could run the filter generation process in a cluster with 1000 or more machines and then disseminate the filters to users of vulnerable software. This would speed up filter generation times by up to three orders of magnitude.

In other scenarios, as described above, an initial filter may be deployed after the first iteration, which takes tens of seconds. Then an improved filter may be deployed after each iteration. Additionally (or instead), if the vulnerable program is run instrumented to detect attacks and to log inputs (e.g. using DFI), the filter can be refined when an attack that bypasses the filter is detected.

Figure 9:
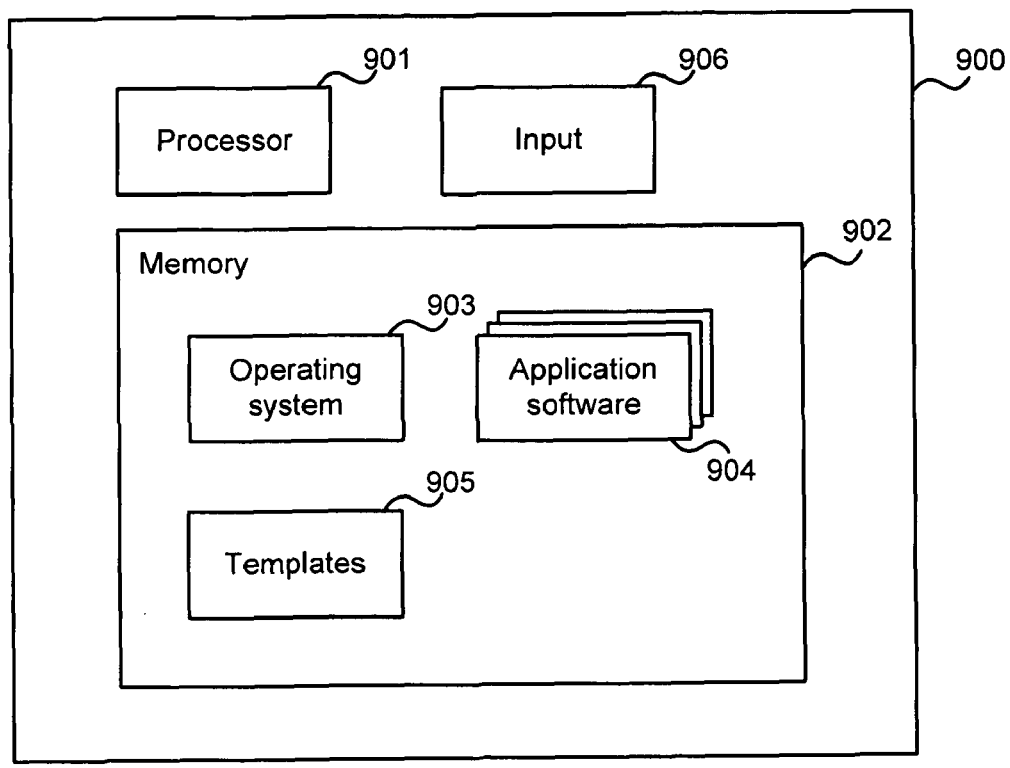
FIG. 9 illustrates an exemplary computing-based device in which embodiments of the methods described herein may be implemented.

As described above, the filter generation process may be run on a single computer or on multiple computers operating in parallel. FIG. 9 illustrates various components of an exemplary computing-based device 900 which may be implemented as any form of a computing and/or electronic device, and in which embodiments of the methods of filter generation may be implemented.

Computing-based device 900 comprises one or more processors 901 which may be microprocessors, controllers or any other suitable type of processors for processing computing executable instructions to control the operation of the device in order to perform any aspects of the filter generation methods described herein. The computer executable instructions may be provided using any computer-readable media, such as memory 902. The memory may be of any suitable type such as random access memory (RAM), a disk storage device of any type such as a magnetic or optical storage device, a hard disk drive, or a CD, DVD or other disc drive. Flash memory, EPROM or EEPROM may also be used.

Platform software comprising an operating system 903 or any other suitable platform software may be provided at the computing-based device to enable application software 904 to be executed on the device. This platform and application software, 903, 904, may be stored in memory 902. The application software may comprise one or more of: an attack detector (such as DFI), a trace generator (such as Nirvana), an application for generation of a representation of program code (such as Phoenix), a module for generation of symbolic summaries (e.g. from templates 905 also stored in the memory 902 or elsewhere), a module for performing the slicing algorithm, a module for combining filter conditions and a module for generating alternative exploits. It will be appreciated that any of these functional program elements may be combined in one or more applications in any way.

The computing-based device 900 may further comprise one or more inputs 906 which are of any suitable type for receiving media content, Internet Protocol (IP) input etc. The input 906 may be used to communicate with other such computing-based devices that are also performing the methods described herein. The input may alternatively or in addition be used to receive sample exploits for use in generation of filters (as described above).

The computing-based device may also comprise other elements (not shown in FIG. 9), such as a communication interface and an output such as an audio and/or video output to a display system integral with or in communication with the computing-based device. The display system may provide a graphical user interface, or other user interface of any suitable type although this is not essential.

Although the present examples are described and illustrated herein as being implemented in a system as shown in FIG. 9, the system described is provided as an example and not a limitation. As those skilled in the art will appreciate, the present examples are suitable for application in a variety of different types of computing and networked systems.

In the implementation of precondition slicing described above, all instructions that are relevant to reach the vulnerability point are executed by the same thread. However, this does not mean that the algorithm only works with single-threaded programs. The algorithms also work with multi-threaded programs and those programs used to evaluate the methods (see experimental results above) are multi-threaded.

Any reference to inputs being messages in the description above is by way of example only. The methods described herein are applicable to any kind of input, including but not limited to, messages, files, user input strings etc.

The term 'computer' is used herein to refer to any device with processing capability such that it can execute instructions. Those skilled in the art will realize that such processing capabilities are incorporated into many different devices and therefore the term 'computer' includes PCs, servers, mobile telephones, personal digital assistants and many other devices.

The methods described herein may be performed by software in machine readable form on a tangible or intangible storage medium. The software can be suitable for execution on a parallel processor or a serial processor such that the method steps may be carried out in any suitable order, or simultaneously. This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person. It will be understood that the benefits and advantages described above may relate to one embodiment or may relate to several embodiments. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

It will be understood that the above description of a preferred embodiment is given by way of example only and that various modifications may be made by those skilled in the art. The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention.

The invention claimed is:

1. A method of generating a filter for inputs to a program comprising:
  generating an execution trace for the program using an exploit for a vulnerability, the execution trace comprising:
    a list of instructions, the list of instructions including instructions executed from a first time an exploit is received to a time an attack is detected; and
    a vulnerability point, wherein the vulnerability point represents, from the list of instructions, a particular instruction executed at the time the attack is detected, the particular instruction being a final instruction in the list of instructions;
  computing an initial set of filter conditions from the execution trace, each filter condition corresponding to an instruction in the execution trace;
  selecting a subset of the instructions in the execution trace that ensure the vulnerability can be exploited;
  generating a revised set of filter conditions by removing conditions from the initial set that do not correspond to an instruction in the subset of instructions;
  generating an alternative exploit based on the revised set of filter conditions, the generating the alternative exploit comprising:
    allocating a score to each of the revised set of filter conditions;
    determining a score for each byte in the exploit based at least on the scores allocated to each of the revised set of filter conditions;
    selecting a byte having a score lower than the score for another of the bytes in the exploit; and
    generating the alternative exploit by removing or duplicating the selected byte having the lower score; and
  when the alternative exploit is valid, repeating the method for the alternative exploit.

2. A method according to claim 1, further comprising:
  automatically generating a filter based on the revised set of filter conditions.

3. A method according to claim 1, wherein selecting a subset of the instructions in the execution trace comprises:
  adding the vulnerability point to the subset;
  adding any operands of the vulnerability point to a first data structure;
  removing the vulnerability point from the trace;
  if a last instruction in the trace is one of a return, call and branch instruction, determining if defined criteria are satisfied and adding the last instruction to the subset if the defined criteria are satisfied;

if the last instruction in the trace is not one of a return, call and branch instruction, adding the last instruction to the subset if the last instruction can overwrite an operand in the first data structure;

updating the first data structure based on any instructions added to the subset;

removing the last instruction from the trace; and repeating the method for a new last instruction in the trace.

4. A method according to claim 3, wherein when the last instruction in the execution trace is a return instruction, the method further comprises:

identifying a corresponding call instruction for a function; and if the defined criteria are not satisfied, removing the corresponding call instruction and all instructions between the corresponding call instruction and the return instruction from the trace;

and wherein the defined criteria comprises:

the function can overwrite an operand in the first data structure.

5. A method according to claim 3, wherein when the last instruction in the execution trace is a call instruction, the method further comprises:

adding any instructions setting up the call instruction to the subset;

and wherein the defined criteria is satisfied by all call instructions.

6. A method according to claim 3, wherein when the last instruction in the execution trace is a branch instruction, the defined criteria comprises:

a criterion that at least one of a plurality of statements are true, the plurality of statements comprising:

a path from the branch instruction does not lead to a last instruction added to the subset; and a path from the branch instruction to the last instruction added to the subset comprises an instruction capable of overwriting an operand in the first data structure.

7. A method according to claim 6, wherein the execution trace comprises concrete values of operands and wherein the plurality of statements further comprises:

an outcome of the branch instruction is not determined by the concrete values in the execution trace corresponding to operands in the first data structure.

8. A method according to claim 3, wherein determining if defined criteria are satisfied uses static analysis.

9. A method according to claim 3, wherein determining if defined criteria are satisfied uses a combination of static analysis and dynamic analysis.

10. A method according to claim 9, wherein the execution trace comprises concrete values of variables and wherein dynamic analysis uses these concrete values from the execution trace.

11. A method according to claim 1, further comprising, when the vulnerability point is within a library function:

replacing filter conditions corresponding to instructions in the library function with a summary condition; and removing instructions after a call instruction for the library function from the execution trace, such that the call instruction comprises a revised vulnerability point.

12. A method according to claim 1, wherein the vulnerability comprises a memory safety violation and wherein selecting a subset of the instructions in the execution trace comprises:

identifying an unsafe write instruction in the execution trace; and adding instructions from the trace prior to and including the unsafe write instruction to the subset.

13. A system for generating an input filter for a program comprising:

an instrumented version of the program arranged to generate an execution trace for the program in response to a bad input, the execution trace comprising a list of instructions executed by the program in response to the bad input until detection of the bad input;

a symbolic execution module arranged to compute an initial set of filter conditions from the execution trace, each one of the filter conditions corresponding to an instruction in the execution trace;

a filter generalization module arranged to:

create a subsequence of the instructions from the execution trace that exploits a vulnerability also exploited by the bad input by removing instructions from the execution trace that do not contribute to the instruction executed when the bad input is detected;

generate a revised set of filter conditions by selecting filter conditions to include in the revised set of filter conditions from the initial set of filter conditions, the revised set of filter conditions being the filter conditions that correspond to instructions in the subsequence;

add a last entry in the execution trace to the subsequence;

add any operands of the last entry to a first data structure;

remove the last entry from the execution trace;

add a last instruction to the subsequence when:

the last instruction in the execution trace is one of a return, call, or branch instruction and if defined criteria are satisfied; or the last instruction in the execution trace is not one of a return, call, or branch instruction and can overwrite an operand in the first data structure;

update the first data structure with any operands of the last instruction when the last instruction is added to the subsequence;

remove the last instruction from the execution trace; and repeat operations of the filter generalization module for a next last instruction in the execution trace; and a filter creation module arranged to automatically generate an input filter based on the revised set of filter conditions.

14. A system according to claim 13, further comprising: an exploit generation module arranged to:

generate an alternative input based at least on the revised set of filter conditions and the bad input, to generate the alternative input, the exploit generation module being further arranged to:

allocate a score to each of the revised set of filter conditions;

determine a score for each byte in the exploit based at least on the scores allocated to each of the revised set of filter conditions;

select a byte having a score lower than the score for another of the bytes in the exploit; and generate the alternative exploit by removing or duplicating the selected byte having the lower score; and transmit the alternative input to the instrumented version of the program.

15. A system according to claim 13, wherein the execution trace comprises concrete values of variables and wherein creating a subsequence of the execution trace uses these concrete values from the execution trace.

16. One or more tangible device-readable media with device-executable instructions for performing steps comprising:

generating an execution trace for the program using an exploit for a vulnerability, the execution trace comprising:
  a list of instructions, the list of instructions including instructions executed from a time a first message is received to a time an attack is detected; and
  a vulnerability point, wherein the vulnerability point represents, from the list of instructions, a particular instruction executed at the time the attack is detected, the particular instruction being a final instruction in the list of instructions;
computing an initial set of filter conditions from the execution trace, each filter condition corresponding to an instruction in the execution trace;
selecting a subset of the instructions in the execution trace that ensure the vulnerability can be exploited; and
generating a revised set of filter conditions by removing conditions from the initial set that do not correspond to an instruction in the subset of instructions;
generating an alternative exploit based at least on the revised set of filter conditions, the generating the alternative exploit comprising:
  allocating a score to each of the revised set of filter conditions;
  determining a score for each byte in the exploit based on the scores allocated to each of the revised set of filter conditions;
  selecting a byte having a score lower than the score for another of the bytes in the exploit; and
  generating the alternative exploit by removing or duplicating the selected byte having the lower score; and
when the alternative exploit is valid, repeating the method for the alternative exploit.

17. One or more tangible device-readable media according to claim 16, wherein the execution trace comprises concrete values of one or more operands and wherein selecting a subset of the instructions in the execution trace uses said concrete values.

18. A method comprising:
generating an execution trace for a program using an exploit for a vulnerability, the execution trace comprising:
  a list of instructions, the list of instructions including instructions executed from a time a first message is received to a time an attack is detected; and
  a vulnerability point, wherein the vulnerability point represents, from the list of instructions, a particular instruction executed at the time the attack is detected, the particular instruction being a final instruction in the list of instructions;
computing an initial set of filter conditions from the execution trace, each filter condition corresponding to an instruction in the execution trace;
selecting the instructions in the execution trace that ensure the vulnerability can be exploited by traversing the execution trace backwards from the vulnerability point and removing instructions that do not contribute to execution of the vulnerability point using dynamic information from the execution trace to create a subset of instructions, the selecting the instructions being based at least on a determination of whether a last instruction in the execution trace is one of a return, call, or branch instruction such that:
  when the last instruction in the execution trace is one of the return, call, or branch instruction determining whether defined criteria are satisfied and adding a last instruction to the subset being created when the defined criteria are satisfied; or
  when the last instruction in the execution trace is not one of the return, call, or branch instruction adding the last instruction to the subset being created when the last instruction can overwrite an operand in the first data structure; and
generating a revised set of filter conditions by removing conditions from the initial set that do not correspond to an instruction in the subset of instructions.

19. One or more tangible device-readable media according to claim 16, the selecting the subset of the instructions in the execution trace comprising:
adding the vulnerability point to the subset;
adding any operands of the vulnerability point to a first data structure;
removing the vulnerability point from the execution trace;
if a last instruction in the execution trace is one of a return, call and branch instruction, determining if defined criteria are satisfied and adding the last instruction to the subset if the defined criteria are satisfied;
if the last instruction in the execution trace is not one of a return, call and branch instruction, adding the last instruction to the subset if the last instruction can overwrite an operand in the first data structure;
updating the first data structure based on any instructions added to the subset;
removing the last instruction from the execution trace; and
repeating the method for a new last instruction in the execution trace.

20. A system comprising a processor operably coupled to the one or more tangible device-readable media as recited in claim 16.

21. A method as recited in claim 18, further comprising:
generating an alternative exploit based on the revised set of filter conditions, generating the alternative exploit comprising:
  allocating a score to each of the revised set of filter conditions;
  determining a score for each byte in the exploit based on the scores allocated to each of the revised set of filter conditions;
  selecting a byte having a score lower than the score for another of the bytes in the exploit; and
  generating the alternative exploit by removing or duplicating the selected byte having the lower score; and
when the alternative exploit is valid, repeating the method for the alternative exploit.

22. One or more tangible device-readable media having device-executable instructions recorded thereon for performing operations as recited in claim 18.

* * * * *